Sept. 12, 1944.  T. S. JAMES  2,357,953
PORTABLE SAWING MACHINE
Filed April 28, 1943   2 Sheets-Sheet 1

Inventor
Tazewell S. James,

Attorney

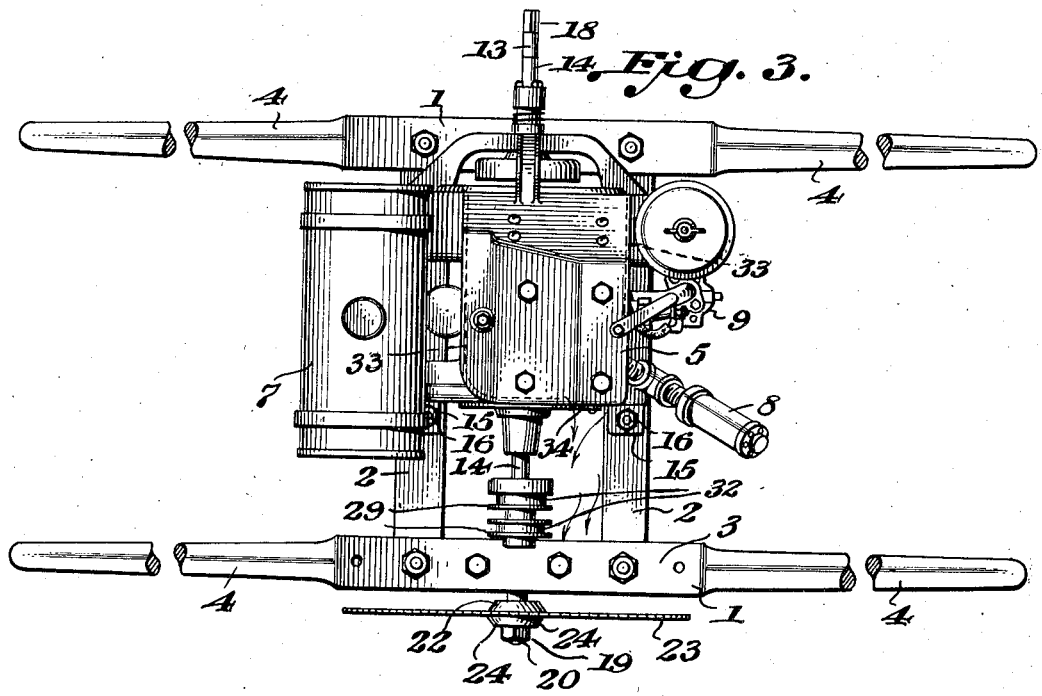
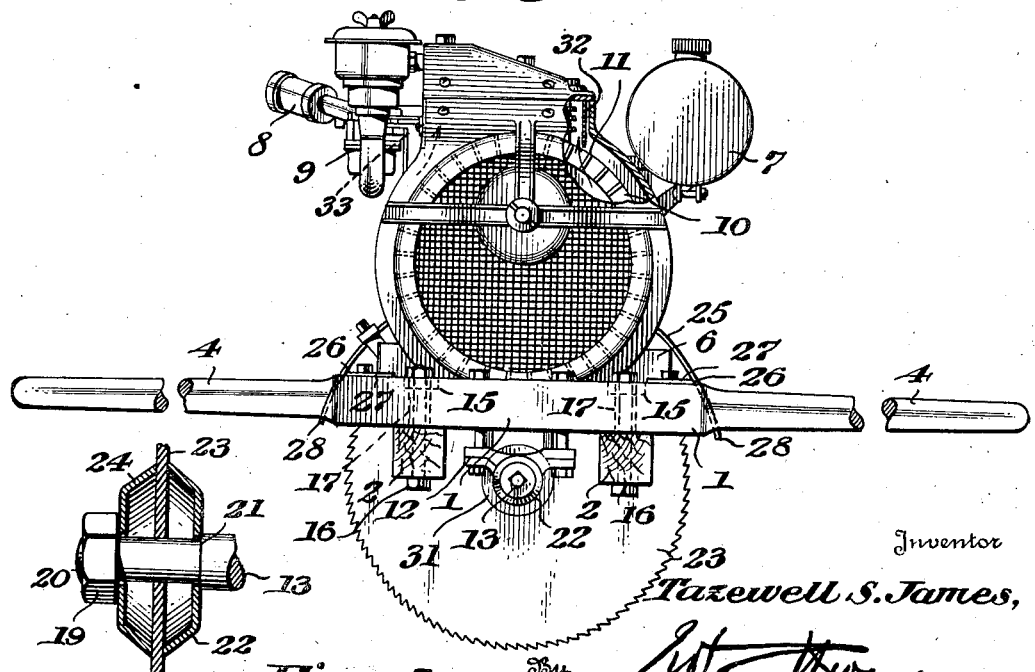

Patented Sept. 12, 1944

2,357,953

UNITED STATES PATENT OFFICE 2,357,953

PORTABLE SAWING MACHINE

Tazewell S. James, Chester, Va.

Application April 28, 1943, Serial No. 484,925

1 Claim. (Cl. 143—43)

The invention relates to a portable sewing machine.

The primary object of the present invention is to provide a simple, practical, and efficient portable sawing machine of strong, durable, and comparatively inexpensive construction which will be sufficiently light in weight to enable it to be conveniently carried from place to place by two men and readily handled by such operators for cutting down trees and sawing the same into logs, and for various other sawing operations where such a saw is desirable or may be advantageously employed.

A further object of the invention is to provide a sawing machine of this character equipped with a circular saw from which the operators will be adequately protected and which will be readily accessible, and easily removed and replaced for sharpening and similar operations.

Another object of the invention is to equip the portable sawing machine with an air cooled motor and to arrange the same so that the current of air which cools the motor will blow across the motor and clear the saw and the motor of sawdust.

With these and other objects in view, the invention consists in the novel construction, arrangement, and combination of parts hereinafter fully described, illustrated in the accompanying drawings, and pointed out in the claims hereto appended, it being understood that various changes in the form, proportion, and minor details of construction may be resorted to without departing from the spirit or sacrificing any of the advantages of the invention.

In the drawings:

Fig. 3 is a plan view;

Fig. 4 is an elevation view showing the side of the sawing machine offset to the side of the machine, as shown in Fig. 1.

Fig. 5 is a detail, sectional view illustrating the means for securing the saw to the transverse shaft.

Figure 1:
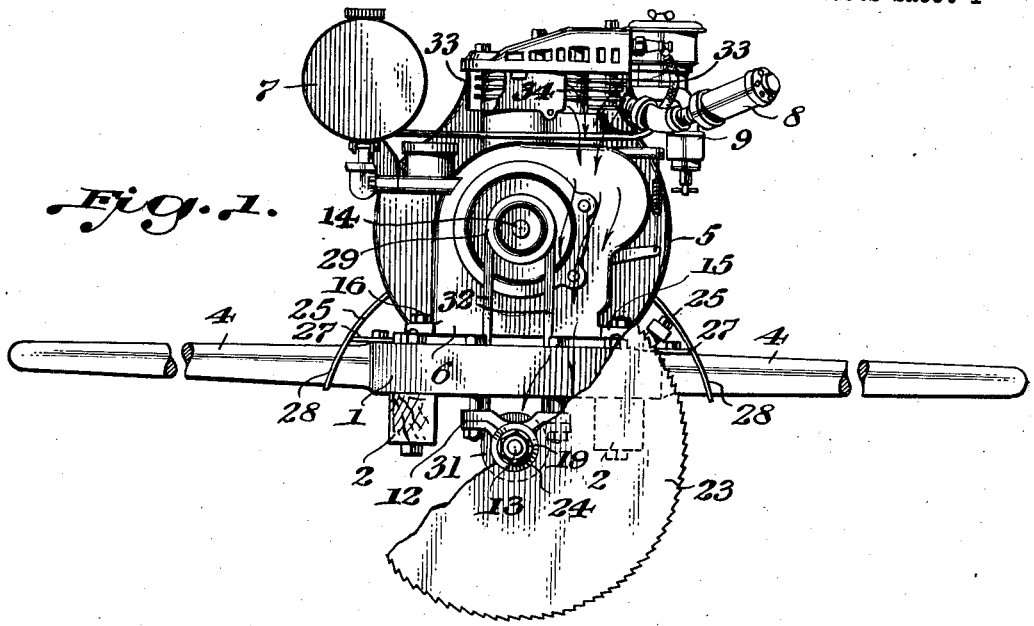
Fig. 1 is a side elevation of a portable sawing machine constructed in accordance with the present invention.
Figure 2:
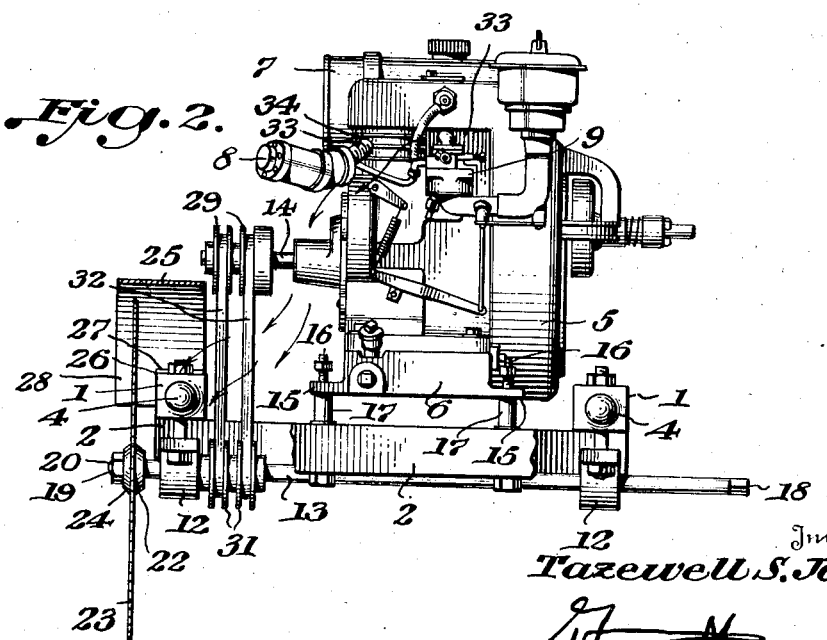
Fig. 2 is an end view.

In the accompanying drawings, in which is illustrated the preferred embodiment of the invention, the portable sawing machine is provided with a frame composed of laterally spaced side bars 1 and transverse connecting bars 2, bolted or otherwise secured to the lower faces of the side bars in spaced relation centrally of the frame.

The frame may be constructed of any suitable material and the side bars, which have square central portions 3, are preferably rounded from the central portions 3 to their ends to form handles 4 for enabling the frame to be readily grasped and carried from place to place by two men.

The transverse bars support a motor 5 and the engine block or base 6 is preferably bolted to the transverse bars in spaced relation to both of the side bars of the frame.

The motor, which may be of any suitable construction, is preferably a single cylinder, four cycle, air cooled, gasoline engine and in the accompanying drawings is illustrated such a motor, which is model A manufactured by Briggs and Stratton of Milwaukee, Wisconsin. Also, in practice, a motor of this type of considerably less weight than model A may be employed.

The motor is equipped with a tank 7, a muffler 8, a carbureter 9, and the usual accessories of such a gasoline engine. This type of motor has a fly-wheel 10 and an interiorly arranged fan 11 which is combined with the fly-wheel and is of the construction supplied with the said Briggs and Stratton motor, model A.

The side bars carry transversely aligned bearings 12 suspended beneath the central portions of the side bars in spaced relation with the transverse bars and arranged between the same for supporting a main transverse shaft 13 below the side and transverse bars with its axis in the vertical plane of the axis of the shaft 14 of the motor. The motor base is provided with projecting ears 15 through which pass bolts 16 for securing the bearings to the cross bars, spacing sleeves 17 being preferably employed and interposed between the ears and the upper faces of the cross bars for supporting the base and motor above the cross bars.

The transverse shaft 13 projects outwardly beyond both sides of the frame of the sawing machine and the projecting portion at the fan side of the motor is provided with a wrench receiving portion 18 which is adapted to be engaged by a wrench or other tool for holding the shaft while a nut 19 is screwed on or off the other end 20 of the shaft, which is threaded for the reception of the nut.

The shaft is provided with a shoulder 21 which forms a stop for an inner clamping collar or member 22 for engaging the inner face of a vertically disposed circular saw 23, which has its outer face engaged by a similar clamping collar or member 24. See Fig. 5. The clamping collars or members which are fitted on the shaft 13 are cup-shaped and present peripheral engaging portions to the opposite faces of the saw and are held in clamping engagement with the same by the nut 19.

The nut may, if desired, by locked against rotation by any suitable means and it will enable the saw to be readily removed from and placed on the shaft for sharpening purposes.

The sawing machine may be equipped with a circular saw of any desired diameter and it extends a sufficient distance below the frame of the machine to enable it to cut through trees for cutting down the same and for cutting up the trees into logs, and for various other sawing operations.

The operators are protected and shielded from accidental contact with the upper portion of the saw by means of a curved saw guard 25, secured to the side bar 1 adjacent the saw and extending over the upper portion of the saw and outward laterally beyond the saw. The saw guard may be constructed of sheet metal or any other suitable material and its end portions are preferably split at 26 to provide attaching portions 27 and also to enable the outer portions 28 to extend downwardly at the outer face of the contiguous side bar, to extend the shield as far as desired to secure the required protection for the operators.

While various means may be employed for transmitting motion from the motor to the transverse shaft, a belt drive is preferably employed. The belt drive comprises an upper pair of grooved pulleys 29, fixed to the shaft 14 of the motor, and a pair of lower grooved pulleys 31 fixed to the transverse shaft 13, on which the circular saw is mounted. The members of each pair of pulleys are arranged contiguous to each other. The shaft of the motor and the transverse shaft rotate counter clockwise, and the teeth of the saw are arranged to cut with a counter clockwise rotation of the saw. The grooved pulleys may be fixed to their respective shafts in any suitable manner.

In operation, the handles of the frame of the portable sawing machine are grasped by two operators and the portable sawing machine may be conveniently handled in moving it from place to place and in arranging the saw to cut down trees and for sawing trees into logs, and for various other sawing operations.

The air from the combined fan and balance wheel blows across the motor and cools the same and emerges from the motor around the fins and beneath the hood at the top of the motor and impinges against the saw and blows the sawdust away from the motor and the saw.

The tension of the belts 32 for transmitting motion from the motor to the saw may be readily adjusted by means of washers arranged on the bolts and located between the motor and the transverse bars of the frame but any other suitable means for tightening the belts may, of course, be provided.

In order to discharge the air in the direction of the saw 23, the motor is provided with a wall 33 extending around the upper portion of the motor at the fins. The wall 33, at the side of the motor adjacent the saw, terminates short of the adjacent corner of the motor and the other end of the wall also terminates short of said corner to provide an outlet 34 for the escape of the air current created by the fan of the motor.

What is claimed is:

A portable sawing machine comprising a portable frame, a circular saw mounted for rotary movement on the frame at one side thereof, an air cooled motor carried by the frame and located adjacent the inner side face of the saw and spaced inwardly therefrom and having an interiorly arranged fan, said motor being provided with a casing having auxiliary wall portions extending partially around the upper portion of the motor and terminating short of one corner of the casing at the side thereof adjacent the saw and arranged to form an air outlet in the wall of the motor casing for causing a current of air from the fan to be directed against the saw, and means for transmitting motion from the motor to the saw.

TAZEWELL S. JAMES.